March 30, 1954     E. FAGIOLI     2,673,403
DEVICE FOR DRYING MATERIALS BY MEANS OF VENTILATION
Filed Aug. 14, 1951     3 Sheets-Sheet 1
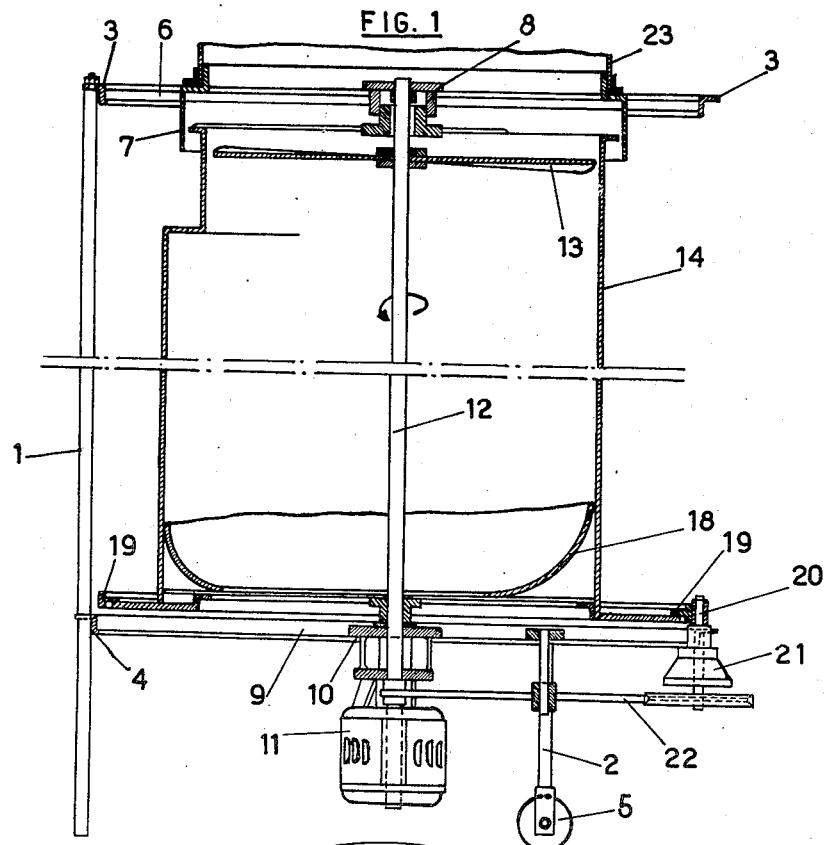
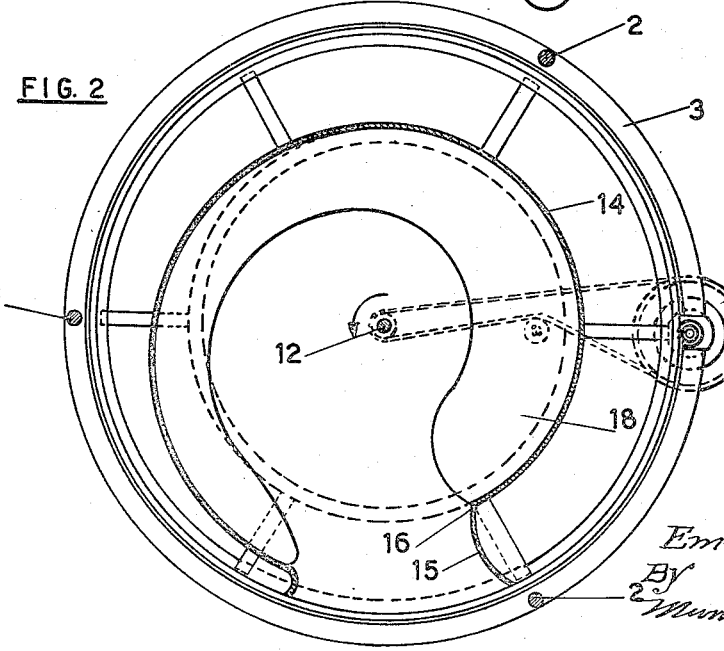
Inventor
Emilio Fagioli
By
Munn, Liddy & Glaccum
Attorneys

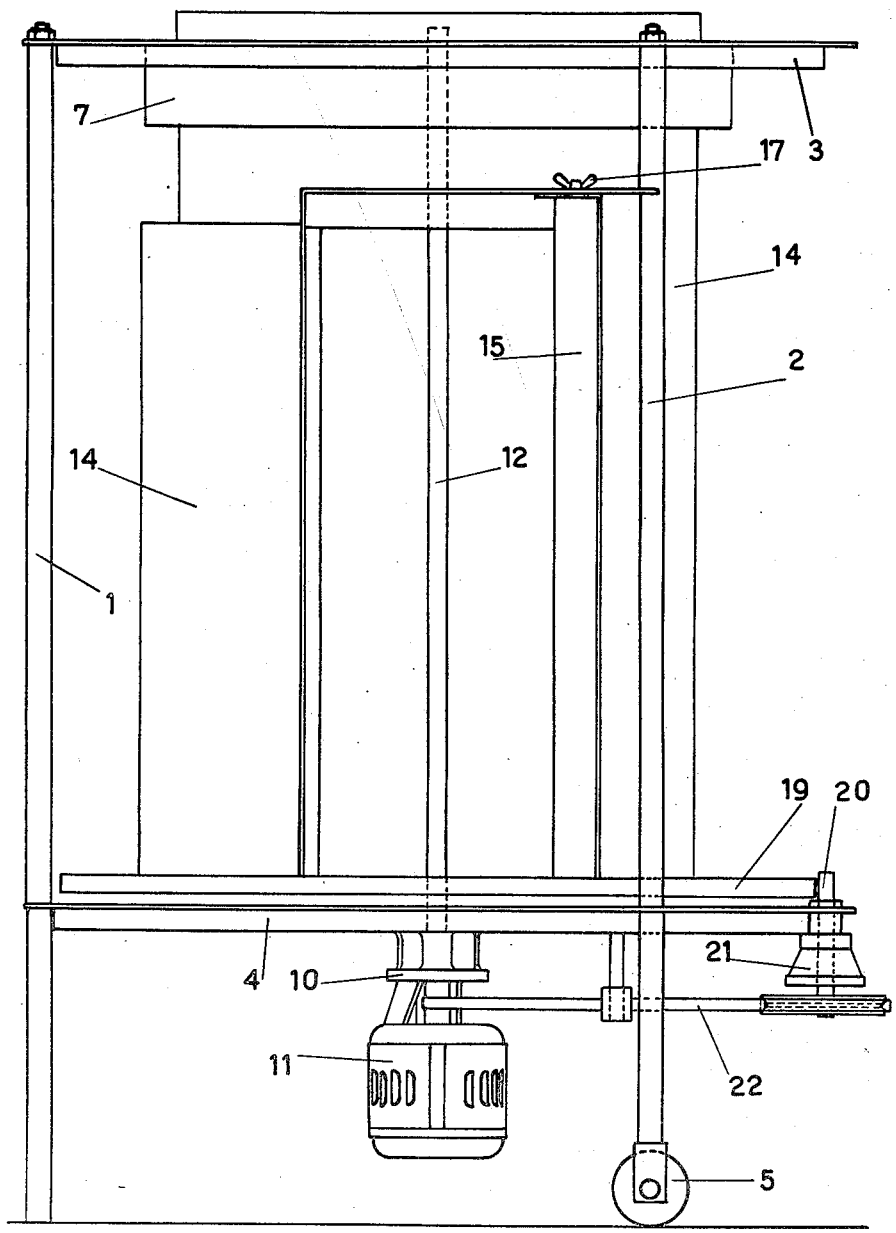

March 30, 1954     E. FAGIOLI     2,673,403
DEVICE FOR DRYING MATERIALS BY MEANS OF VENTILATION
Filed Aug. 14, 1951     3 Sheets-Sheet 3
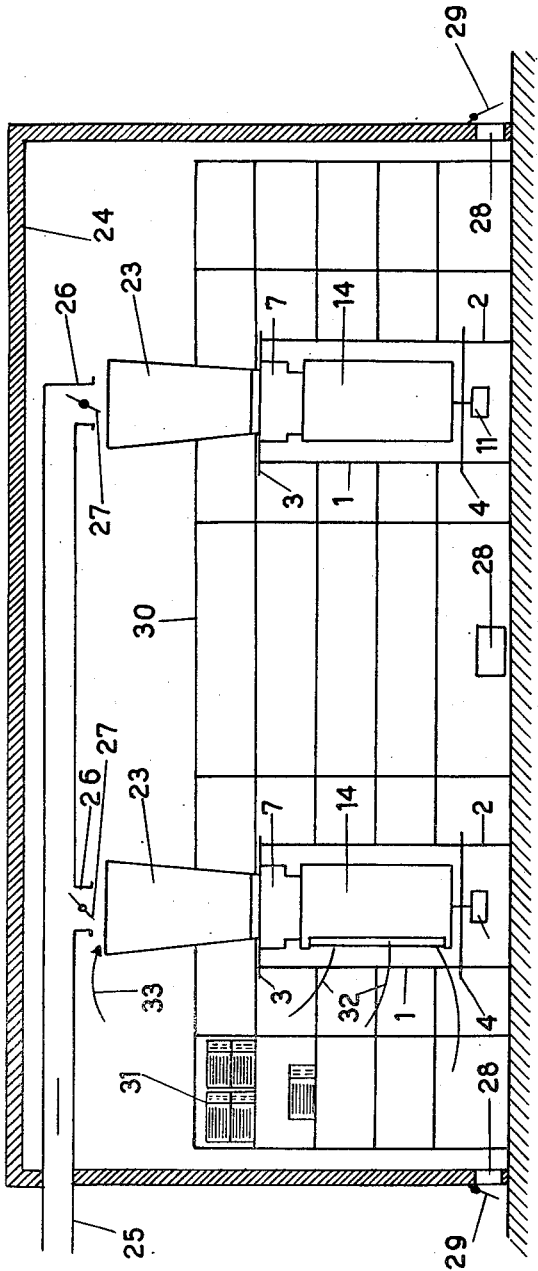
Inventor
Emilio Fagiolo
By Munn, Liddy & Gelaccum
Attorneys

UNITED STATES PATENT OFFICE 2,673,403

DEVICE FOR DRYING MATERIALS BY MEANS OF VENTILATION

Emilio Fagioli, Milan, Italy

Application August 14, 1951, Serial No. 241,797

Claims priority, application Italy August 18, 1950

4 Claims. (Cl. 34—222)

In plants for drying materials by means of ventilated air, generally heated air, the rate of evaporation of water, for a given percentage of humidity contained in the ventilated air, increases with the speed and temperature of said ventilated air. However, it is almost always impossible to utilize completely the drying power of the air stream, for two reasons: firstly, after a first period, during which the superficial layer of material is dried, a limit to the drying rate is provided by the generally small velocity with which the water rises by capillary action from the deeper layers to the surface of the material; secondly, it is not possible to dry the superficial layers too rapidly because in such case they would either crack so as to injure the product, or form a practically watertight crust, which prevents the water contained in the deep layers from reaching the surface so as to be vaporized.

It is an object of the present invention to provide a process for drying materials, wherein short periods of very quick drying with a speedy air current at the most suitable temperature, are alternated in uniform sequence with periods of relative rest and of sufficient length of duration, so that the water contained inside the material may come to the surface thereof and wet the external layers previously dried, before the inconveniences mentioned above occur.

With this process, the current of air flowing over the material vaporizes the water which is at the surface of said material; before a drying occurs in interior layers, the current of air is turned off so that the material is no longer subjected to the drying action, so that the water contained in the inner mass is enabled to rise to the surface and the distribution of water in respect to the solid parts becomes uniform again.

For a given material having a given degree of moisture therein, it is possible to determine by experiments what temperature, what relative moisture and what speed a current of air directed onto the material must have to determine the best efficiency of vaporization of the water which is at the surface of the material.

These conditions of highest efficiency, however, cannot be attained with conventional dryers because such conditions would involve such a rapid superficial drying of the material, that they would soon produce the inconveniences mentioned.

The degree of non-uniformity in the distribution of water in the mass owing to the drying action of the aforesaid air current, depends on the intensity of the drying action of said current as well as on its duration. This degree of non-uniformity should not surpass, in any case, a certain limit, if it is desired to prevent the superficial portion of the material from cracking or setting in impermeable form due to excessive drying.

Now it will be understood that if the drying action of the air current directed onto the material is very intense, but the duration of each period during which the air current acts upon the material is very short, it is possible to avoid the aforementioned inconvenience arising from too intensive drying of the superficial layers as compared with the inner layers of the material.

If the operation is to be continued, a sufficient time has to elapse during which no drying air current is acting, so as to allow the moisture contained in the mass of material to become distributed therethrough until a sufficient uniformity is reached prior to subjecting again the material to the air current.

It is very important to notice that by proceeding in this way the current of air is always directed onto wet surfaces, because when the water at the surface of the material has been vaporized, the current of air is directed to other material, whose surface has had sufficient time to get moistened by water rising from inner layers. Consequently, the efficiency of drying is much higher than with conventional driers in which, when the superficial water has vaporized, the current of air must heat the water contained in the deeper layers of the material by conduction through the superficial layers which have been already dried. This efficiency is further enhanced by the fact that as the air acts upon layers of material which are wet, a relatively low air temperature suffices to attain a degree of vaporization, which could not be attained with the same temperatures in conventional driers.

It has been found that for the majority of materials that cannot be dried in a rapid manner for the reasons explained hereinbefore, the current of drying air has to be interrupted for a period of at least one minute in order that the distribution of moisture within the material can become practically uniform again, after a short and active superficial drying. On the other hand it has been found that a very short time is sufficient for the superficial drying, because the materials dried are generally of a colloidal structure and the diffusion of water towards the surface thereof is very slow.

For each material to be dried it is possible, therefore, to establish a ratio between the time during which the material has to be subjected to a current of drying air, and the time during which it has to remain at rest in the absence of the current of air. The ratio has to be comparatively small, smaller than 1/4; at any rate it is evident that it must be the same for the whole of material to be subjected to drying, in order to avoid losses of efficiency on one hand and unsatisfactory results on the other hand.

For this reason, the process according to the invention consists in directing onto the material to be dried, a jet of air rotating uniformly at a speed smaller than one turn per minute, while fresh air is introduced into a chamber holding the material and an equal quantity of air is taken off therefrom in moist condition.

It has already been proposed to effect in a drying plant intermittent ventilation by means of reciprocating fans, but with this method the intervals between two subsequent air currents are different at the different points of the drier, whence the drying does not turn out to be uniform as with conventional driers and the drying capacity of the plant is therefore limited by the behavior of the material which happens to be in the most unfavorable position.

The process according to the invention is advantageously carried out by means of a device for ventilation, which rotates about a vertical axis during a period lasting longer than one minute, and provided with a mouth that directs the jet of air in a zone confined within an acute angle; said device generally comprises also means for heating the ventilated air and a plurality of these devices may be arranged in the same device, at a distance depending on the speed and on the delivered quantity of air as blown by each device.

Moreover, usually the dry air introduced can be heated so that the air itself furnishes the heat necessary for vaporization.

The process according to the invention can be embodied in practice, for example, with an apparatus as illustrated in the accompanying drawings, wherein Fig. 1 is a vertical section through the axis of the apparatus; Fig. 2 is a horizontal section thereof; Fig. 3 is a lateral view; Fig. 4 is a diagrammatical longitudinal section of a drier working with devices of the kind represented in Figures 1 and 2.

The aforesaid device is composed of a frame formed by uprights 1 and 2 connected by rings 3 and 4; the uprights 2 are provided with wheels 5 so as to ease transport of the apparatus. To the ring 3 there are fixed the cross-irons 6 which carry the annular flange 7 and the support 8; to the lower ring 4 there are connected the cross-irons 9 carrying the support 10. The support 10 carries an electric motor 11, whose shaft 12 extends through the support 10 upwards and is held at its end by the support 8; in close proximity to this support, the shaft 12 carries the fan 13.

Moreover, the supports 8 and 10 carry a case 14 mounted for pivoting about the axis of the shaft 12. The case 14 has a screw shape and surrounds the fan 13. Its vertical walls are provided with a vertical oblong slot constituting the delivery mouth of the ventilator assembly; this slot is adjustable in width by means of a plate 15 pivoted at 16 on the case 14 and adapted to be fastened in the desired position by means of a locking member 17. The vertical wall of the case 14 is joined with the plane bottom thereof by means of a curved metal sheet 18, whose curvature increases in cross-section in the sense in which the shaft 12 turns. To the bottom of the case 14 there is fixed a ring 19 the peripheral surface of which is cylindrical and coaxial with the shaft 12. Against this cylindrical surface there engages a roll 20 rotated by a speed reduction gear 21 fixed to the frame and actuated in turn by a transmission 22. The ratio of transmission with which the rotary movement is thus transmitted from the shaft 12 to the ring 19 and, therefore, to the case 14, may be rendered variable with means known per se. Onto the annular body 7 there is fitted a vertical conduit 23.

The apparatus as described hereinbefore is placed for operation into a drying chamber diagrammatically indicated in Fig. 4; in this figure, in the chamber 24 there are placed two of these apparatus, but it is evident that the number of apparatus may be set according to the dimensions and shape of the chamber of the drier.

As can be seen from Fig. 4, the upper portion of the chamber 24 communicates with a pipe 25, which conveys hot air coming for example from the chambers of a furnace; the pipe 25 is provided with small outlets 26 under which are placed the apparatus hereinbefore described, so that the hot air coming out thereof may be easily sucked by the conduits 23; the outlets 26 are provided with throttling means 27 for adjusting the quantity of hot air delivered. The walls of the chamber 24 are provided at bottom with openings 28 provided with oscillating retaining doors 29 for allowing exit of moist air, inside the chamber 24 there are arranged convenient supports 30 for the material to be dried, as represented diagrammatically by way of example at 31. The supports 30 may of course be displaceable inside the drier or be transported outside together with the material 31.

On starting, the action of the fan 13 directs a strong current of air against the material, this current coming from the lateral mouth of the apparatus in the direction indicated by the arrows 32 in Fig. 4. This current of air engages the material, rising somewhat in the chamber 24 where the upper mouth of the conduit 23 exerts suction as indicated with arrow 33 in Fig. 4. With the air entering the conduit 23 along arrow 33, a quantity of hot air is drawn in and mixed with the recycled air to supply the heat necessary for vaporizing the water contained in the material 31.

The rotation of the shaft 12 of the fan 13 causes by way of the speed reducing transmission as described a slow rotation of the case 14 so that successive portions of material 31 as placed on the supports 30 are engaged by the jet of air and, after a determined section of material 31 has been subjected to the action of said air current, there follows a comparatively long period during which it is not subjected to any ventilating action. As can be seen on inspecting Fig. 2, the current of air generated by the fan 13 is directed outside the apparatus within a comparatively narrow angle, whence the period of time during which a piece of material to be dried is subjected to the current coming from the apparatus, is much smaller than the remaining period of the cycle during which the current is directed elsewhere. The duration of these periods should of course be chosen as a function of the material to be dried and of its conditions, as well as depending on the temperature and humidity of the air that is made to circulate in the drier; by way of example, the duration of time during which a piece of material is subjected to the current of air may be 20 seconds, the duration of the entire rotation of the case 14 being one and a half minutes.

Still by way of example, the following experiment may be reported.

In a chamber of 1200 m.³ were placed 87,000 kg. of cured perforated tiling material containing 19,000 kg. water. In said chamber, there were accommodated apparatus of the type hereinbefore described, moving air at a rate of 30,000 m.³/hour. Into the apparatus there was introduced a total quantity of 3,600 m.³/hour of hot air at a temperature of 195° C. After 96 hours, the material was completely dried. During the drying process, the average temperature of the chamber was 33° C., its relative moisture 65%, the relative moisture of the air discharging from the apparatus being about 45%.

Of course the examples hereinbefore reported are given only by way of illustration.

It may be convenient, for example, especially for certain delicate materials such as alimentary paste, that the sucking inlet of the apparatus be at bottom and the lateral blowing outlet at top, the hot air being of course introduced in correspondence with the sucking inlets. Also the data of delivery, temperature and moisture of the blown air should be determined in each individual case, in order to attain the conditions of optimum efficiency as set forth hereinbefore.

Having now particularly described and ascertained the nature of my said invention and in what manner the same is to be performed, I declare that what I claim is:

1. A drying apparatus comprising, in combination, a chamber having a cylindrical open end portion located about a predetermined axis and a side wall located next to said end portion and having spaced side edge portions one of which is located nearer to said axis than the other of said side edge portions and at the same radial distance from said axis as said cylindrical end portion, said side wall forming adjacent said one side edge portion thereof an extension of said cylindrical end portion and said side wall being located from said axis by gradually increasing radial distances as said side wall approaches said other side edge portion thereof from said one side edge portion thereof, said side wall extending about said axis through more than 270° so as to form between said side edge portions of said side wall an opening extending in a direction substantially parallel to said axis and being located outside of a cylindrical space located within said side wall about said axis and having the same radius as said cylindrical end portion of said chamber, said cylindrical end portion of said chamber being connected about its entire periphery to said side wall by a wall portion extending substantially transversely to said axis; support means located adjacent to said chamber; fan means turnably mounted on said support means and being located in said cylindrical end portion of said chamber to draw a fluid into said chamber through said cylindrical end portion thereof, so that the fluid will first move into said cylindrical space and will then issue at a uniform rate from all parts of said opening located between said side edge portions of said side wall of said chamber.

2. A drying apparatus comprising, in combination, a chamber having a cylindrical open end portion located about a predetermined axis and a side wall located next to said end portion and having spaced side edge portions one of which is located nearer to said axis than the other of said side edge portions and at the same radial distance from said axis as said cylindrical end portion, said side wall forming adjacent said one side edge portion thereof an extension of said cylindrical end portion and said side wall being located from said axis by gradually increasing radial distances as said side wall approaches said other side edge portion thereof from said one side edge portion thereof, said side wall extending about said axis through more than 270° so as to form between said side edge portions of said side wall an opening extending in a direction substantially parallel to said axis and being located outside of a cylindrical space located within said side wall about said axis and having the same radius as said cylindrical end portion of said chamber, said cylindrical end portion of said chamber being connected about its entire periphery to said side wall by a wall portion extending substantially transversely to said axis; support means located adjacent to said chamber; fan means turnably mounted on said support means and being located in said cylindrical end portion of said chamber to draw a fluid into said chamber through said cylindrical end portion thereof, so that the fluid will first move into said cylindrical space and will then issue at a uniform rate from all parts of said opening located between said side edge portions of said side wall of said chamber; an elongated door member pivotally connected along one of its side edges to one of said side edge portions of said side wall of said chamber; and adjusting means operatively connected to said door member to adjust the angular position thereof so as to thereby cover said opening by a predetermined extent.

3. A drying apparatus comprising, in combination, a chamber having a cylindrical open end portion located about a predetermined axis and a side wall located next to said end portion and having spaced side edge portions one of which is located nearer to said axis than the other of said side edge portions and at the same radial distance from said axis as said cylindrical end portion, said side wall forming adjacent said one side edge portion thereof an extension of said cylindrical end portion and said side wall being located from said axis by gradually increasing radial distances as said side wall approaches said other side edge portion thereof from said one side edge portion thereof, said side wall extending about said axis through more than 270° so as to form between said side edge portions of said side wall an opening extending in a direction substantially parallel to said axis and being located outside of a cylindrical space located within said side wall about said axis and having the same radius as said cylindrical end portion of said chamber, said cylindrical end portion of said chamber being connected about its entire periphery to said side wall by a wall portion extending substantially transversely to said axis; support means located adjacent to said chamber; fan means turnably mounted on said support means and being located in said cylindrical end portion of said chamber to draw a fluid into said chamber through said cylindrical end portion thereof, so that the fluid will first move into said cylindrical space and will then issue at a uniform rate from all parts of said opening located between said side edge portions of said side wall of said chamber; and turning means operatively connected to said chamber for turning the same about said axis.

4. A drying apparatus comprising, in combination, a chamber having a cylindrical open end portion located about a predetermined axis and a side wall located next to said end portion and having spaced side edge portions one of which is located nearer to said axis than the other of said side edge portions and at the same radial distance from said axis as said cylindrical end portion, said side wall forming adjacent said one side edge portion thereof an extension of said cylindrical end portion and said side wall being located from said axis by gradually increasing radial distances as said side wall approaches said other side edge portion thereof from said one side edge portion thereof, said side wall extending about said axis through more than 270° so as to form between said side edge portions of said side wall an opening extending in a direction substantially parallel to said axis and being located outside of a cylindrical space located within said side wall about said axis and having the same radius as said cylindrical end portion of said chamber, said cylindrical end portion of said chamber being connected about its entire periphery to said side wall by a wall portion extending substantially transversely to said axis; support means located adjacent to said chamber; fan means turnably mounted on said support means and being located in said cylindrical end portion of said chamber to draw a fluid into said chamber through said cylindrical end portion thereof, so that the fluid will first move into said cylindrical space and will then issue at a uniform rate from all parts of said opening located between said side edge portions of said side wall of said chamber; an elongated door member pivotally connected along one of its side edges to one of said side edge portions of said side wall of said chamber; adjusting means operatively connected to said door member to adjust the angular position thereof so as to thereby cover said opening by a predetermined extent; and a substantially funnel-shaped conduit communicating with said cylindrical open end portion of said chamber, being located along said axis and having opposite ends of different sizes, the smaller of said ends being located adjacent to said cylindrical end portion of said chamber and the larger of said ends being located distant therefrom.

EMILIO FAGIOLI.

References Cited in the file of this patent

UNITED STATES PATENTS

| Number | Name | Date |
|---|---|---|
| 673,393 | Gans | May 7, 1901 |
| 989,137 | Falchi | Apr. 11, 1911 |
| 1,079,547 | Falchi | Nov. 25, 1913 |
| 1,884,898 | Smith | Oct. 25, 1932 |
| 2,244,879 | Heras | June 10, 1941 |

FOREIGN PATENTS

| Number | Country | Date |
|---|---|---|
| 56,160 | Netherlands | Apr. 15, 1944 |
| 260,605 | Italy | Oct. 3, 1928 |